US010562389B2

(12) United States Patent
Vacca

(10) Patent No.: US 10,562,389 B2
(45) Date of Patent: Feb. 18, 2020

(54) SUSPENDED GRILLE ACTIVE SHUTTER

(71) Applicant: Valeo Systemes Thermiques, Le Mesnil Saint Denis (FR)

(72) Inventor: Frédéric Vacca, Le Mesnil Saint Denis (FR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 0 days.

(21) Appl. No.: 15/780,562

(22) PCT Filed: Nov. 8, 2016

(86) PCT No.: PCT/FR2016/052894
§ 371 (c)(1),
(2) Date: May 31, 2018

(87) PCT Pub. No.: WO2017/093628
PCT Pub. Date: Jun. 8, 2017

(65) Prior Publication Data
US 2018/0361847 A1 Dec. 20, 2018

(30) Foreign Application Priority Data

Dec. 1, 2015 (FR) ...................................... 15 61627

(51) Int. Cl.
*B60K 11/00* (2006.01)
*B60K 11/08* (2006.01)
(52) U.S. Cl.
CPC ......... *B60K 11/085* (2013.01); *B60Y 2306/01* (2013.01)

(58) Field of Classification Search
CPC ........ B60K 11/085; B60K 11/08; B60K 11/00
See application file for complete search history.

(56) References Cited

U.S. PATENT DOCUMENTS 7,967,350 B2 * 6/2011 Ginja ..................... B60R 19/12
188/371
8,091,516 B2 * 1/2012 Preiss .................... B60K 11/04
123/41.05
8,181,727 B2 * 5/2012 Ritz ..................... B60K 11/085
180/68.1

(Continued)

FOREIGN PATENT DOCUMENTS

DE 10 2013 007340 A1 10/2014
FR 3 013 302 A1 5/2015

(Continued)

OTHER PUBLICATIONS

International Search Report issued in PCT/FR2016/052894 dated Feb. 17, 2017 (2 pages).

(Continued)

*Primary Examiner* — James M Dolak
(74) *Attorney, Agent, or Firm* — Osha Liang LLP

(57) ABSTRACT

An inlet-air management device for a motor vehicle may include a flexible duct for guiding the air entering via a motor vehicle grille and a shutter device fixed in the flexible duct. Additionally, an inlet-air management device is configured to be fixed in a motor vehicle via the flexible duct. Further, the shutter device is then being suspended in the motor vehicle via the flexible duct.

9 Claims, 2 Drawing Sheets

(56) References Cited

U.S. PATENT DOCUMENTS

| | | | | |
|---|---|---|---|---|
| 8,292,014 B2* | 10/2012 | Sugiyama | ............ | B60K 11/085 123/41.06 |
| 8,794,363 B2* | 8/2014 | Wolf | .................... | B60K 11/085 180/68.1 |
| 8,936,121 B2* | 1/2015 | Vacca | .................... | B60K 11/04 165/44 |
| 9,644,525 B2* | 5/2017 | Bignon | ................ | B60K 11/085 |
| 9,676,422 B2* | 6/2017 | Schmidt | ............... | B62D 25/085 |
| 9,694,666 B2* | 7/2017 | Bruemmer | ............. | B60K 11/04 |
| 9,890,688 B2* | 2/2018 | Bui | ........................ | B60K 11/08 |
| 10,155,438 B2* | 12/2018 | Vacca | .................... | B60K 11/08 |
| 10,202,049 B2* | 2/2019 | Nagaosa | ............. | B60H 1/3229 |
| 10,226,994 B2* | 3/2019 | Roussel | ................ | B60K 11/08 |
| 10,323,852 B2* | 6/2019 | Takanaga | ............. | F24F 7/00 |
| 10,377,226 B1* | 8/2019 | Ross | ....................... | B60R 21/34 |
| 2006/0102109 A1* | 5/2006 | Becker | .................. | B60K 11/08 123/41.48 |

FOREIGN PATENT DOCUMENTS

| | | |
|---|---|---|
| JP | 2007 001503 A | 1/2007 |
| WO | 2015/165939 A1 | 11/2015 |

OTHER PUBLICATIONS

Written Opinion issued in PCT/FR2016/052894 dated Feb. 17, 2017 (6 pages).

\* cited by examiner

SUSPENDED GRILLE ACTIVE SHUTTER

BACKGROUND

The object of the invention is an air inlet management device for a motor vehicle. A suchlike device may comprise a shutter device, sometimes referred to as an active shutter for a radiator grille, or also as a controlled air inlet module. A suchlike device is very often designated by the acronym AGS, which derives from the English expression "Active Grille Shutter". The device permits the access of the air via a radiator grille of a motor vehicle to be opened or closed. In the open position, the air may circulate through the radiator grille and may participate in the cooling of the engine of the motor vehicle. In the closed position, the air does not penetrate via the radiator grille, which reduces the drag and thus permits the consumption of fuel and the emission of $CO_2$ to be reduced. The AGS thus permits the consumption of energy and the pollution to be reduced when the engine does not require to be cooled by the outdoor air.

It is helpful at the design stage of a motor vehicle to ensure that the consequences of an accident, in the course of which the motor vehicle were to strike an obstacle, are reduced to a minimum. It is particularly appropriate to reduce the risks of bodily injury (in particular when a pedestrian is knocked over by the motor vehicle), but also to reduce material damage to the motor vehicle itself.

An AGS conventionally comprises an activator (also referred to as an actuator) for controlling the flaps permitting the opening or the closing of the air inlet. The flaps and the frame of the AGS carrying these flaps are usually made of plastic. This material has the advantage of being light and inexpensive. In addition, the plastic deforms or ruptures easily in the event of an impact, thereby absorbing the impact and reducing the risk of serious damage. It is nevertheless preferable not to damage the AGS. In addition, the actuator is a relatively expensive device, which is also very heavy. In the event of impact, the actuator is often damaged, which involves high repair costs. Furthermore, in the event of an impact with a pedestrian, the actuator is likely to cause more serious injuries than those which may be caused solely by the flaps of the AGS.

SUMMARY OF DISCLOSURE

The invention proposes to improve the situation.

The invention relates in particular to an air inlet management device for a motor vehicle, comprising:

a flexible duct for guiding the air entering via a motor vehicle radiator grille and a shutter device fixed in the flexible duct, the air inlet management device being configured to be fixed in a motor vehicle via the flexible duct, the shutter device then being suspended in the motor vehicle via the flexible duct.

A suchlike air inlet management device is advantageous in particular in the sense that, in the event of an impact, in particular a low-speed impact, the flexible duct deforms and is thus able to absorb the energy resulting from the impact by preventing damage from being caused to the shutter device. Furthermore, suspending the shutter device protects it from vibrations originating, for example, from the wheel or the engine of the motor vehicle. The expression flexible duct is understood to denote that the duct is sufficiently rigid to maintain the AGS in a normal condition (or ahead of an impact) and sufficiently flexible in order to permit the recoil of the shutter device in the event of impact as well as a possibility of returning to the initial position, if necessary. In other words, the flexible duct is capable of maintaining the AGS and is capable of deforming, without rupturing, in order to permit the recoil of the AGS. The duct may also be capable of deforming in such a way as to return to an initial position following an impact. Certain thermoplastic polymers, such as polypropylene and ethylene propylene diene monomer, exhibit such properties.

The invention also relates to an air inlet management device, in which the flexible duct is molded onto the shutter device.

The invention also relates to an air inlet management device, in which the flexible duct is snapped into engagement on the shutter device.

The invention also relates to an air inlet management device, in which the flexible duct is made of thermoplastic polymer, in particular polypropylene or ethylene propylene diene monomer.

The invention also relates to an air inlet management device, in which the flexible duct is configured to be fixed by one extremity to the radiator grille of a motor vehicle.

The invention also relates to an air inlet management device, in which the flexible duct is configured to be fixed by one extremity to a support for a radiator or to a heat exchanger cassette.

Other characterizing features and advantages of the invention will become apparent from a perusal of the following description. This is purely illustrative and must be read having regard for the accompanying drawings.

DETAILED DESCRIPTION

Figure 1:
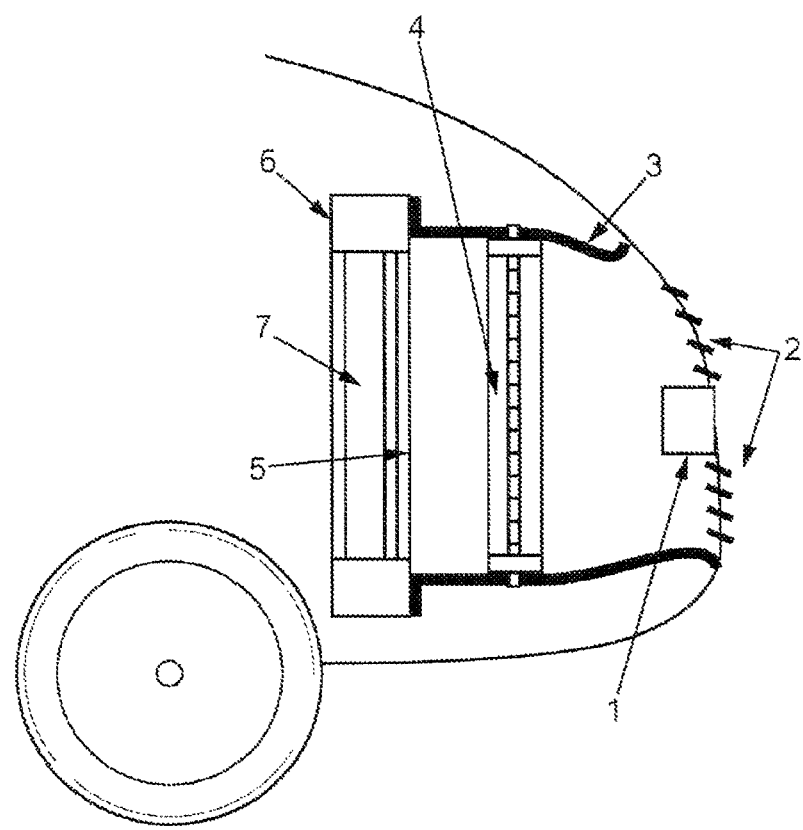
FIG. 1 depicts a longitudinal vertical section of a motor vehicle equipped with an air inlet management device according to one embodiment of the invention.

FIG. 1 depicts a vertical section of a motor vehicle in a longitudinal direction of the vehicle. The vehicle comprises a fender beam 1, above and below which front-panel gratings 2 are positioned. These gratings are fixed, and they remain in an open position. The vehicle also comprises a flexible duct 3, surrounding a shutter device 4 (AGS) fixed to said flexible duct. The flexible duct 3 guides the air entering via the radiator grille (via the gratings 2) as far as the AGS 4, and guides the air exiting from the AGS as far as a condenser 5. The flexible duct is fixed to the support 6 for a radiator 7 (commonly referred to in English as the bolster or bulkhead).

Figure 2:
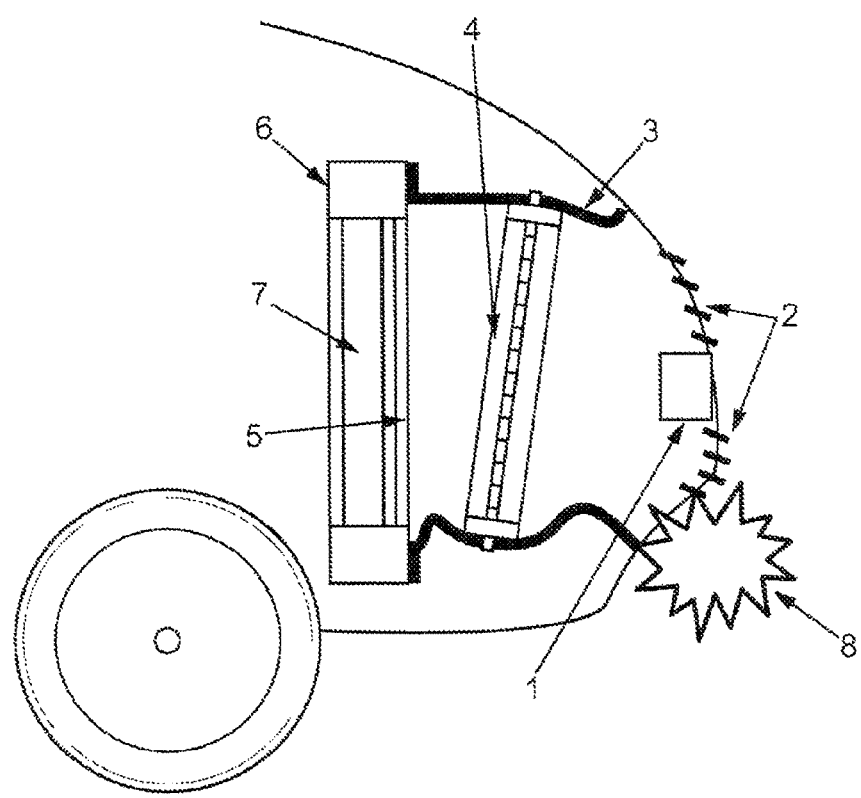
FIG. 2 depicts a longitudinal vertical section of an accident-damaged motor vehicle equipped with an air inlet management device according to one embodiment of the invention.

FIG. 2 illustrates a motor vehicle identical to that which is illustrated in FIG. 1, but which is involved in an accident. It can thus be appreciated that the vehicle is striking an obstacle 8 situated beneath the fender beam 1. The shock resulting from this accident deforms the base of the flexible duct 3 and displaces the AGS 4. The AGS 4 is intact, however, and can be put back in place easily after the repair of the bodywork that has been damaged by the accident.

A first embodiment relates to an air inlet management device for a motor vehicle. This device comprises a flexible duct 3 for guiding the air entering via a radiator grille of a motor vehicle.

A shutter device 4 is fixed in the flexible duct 3.

Thus, when the air inlet management device is installed in a motor vehicle, and when this motor vehicle moves, the air which penetrates via the front of the vehicle (because of the relative speed of the vehicle in relation to the air) is guided by the flexible duct 3 towards the shutter device 4.

If the latter is in the closed position, the flow of air is blocked, which reduces the drag of the vehicle and accordingly the fuel consumption and $CO_2$ emissions.

If, on the other hand, the shutter device 4 is in the open position (in order to increase the cooling of the engine), the flow of air continues on its way until it arrives at the radiator 7, being guided as it does so by the flexible duct 3. A suchlike flow of air causes higher drag. It therefore increases the fuel consumption of the motor vehicle and the $CO_2$ emissions.

The air inlet management device is configured to be fixed in a motor vehicle via the flexible duct 3. The shutter device 4 is then suspended in the motor vehicle via the flexible duct 3, instead of being fixed directly to a rigid element of the motor vehicle. This protects the shutter device 4 in the event of impact (to the extent that this impact is absorbed by the flexible duct). This also protects those elements of the motor vehicle to which the shutter device is usually fixed. In fact, when the energy of an impact is transmitted to the state-of-the-art shutter device, it is also transmitted to the elements to which this shutter device is fixed in a rigid manner. According to the first embodiment, wherein the fixing is implemented by suspension rather than by a rigid fixing, the transmission of the energy of any impacts is thus prevented or at least absorbed, even if it is propagated as far as the shutter device 4. Also avoided in this way, in the event of an impact, is the loss of any mechanical components which could become detached from the shutter device 4 and/or of any element or elements to which this shutter device was fixed in a rigid manner in the prior art. Depending on the impact, the shutter device 4 may be displaced because of the deformation of the flexible duct 3. In general, a suchlike displacement of the shutter device 4 will not damage it (in the case of low-speed impacts). All that is then necessary is to put the shutter device 4 back in place by repositioning the flexible duct 3 in its original position, after having repaired any elements of the bodywork (or other elements) that may have been damaged.

Suspending the shutter device 4 also protects this shutter device from vibrations. The vibrations, which may originate, for example, from the fans, from the engine of the motor vehicle, or even from the road, are filtered by the flexible duct 3, which performs a form of decoupling. This may contribute to the reduction of the perceptible noise in the interior of the vehicle, as well as to the reduction of the wear in the component parts (in particular those making up the shutter device 4).

According to a second embodiment, the flexible duct 3 of an air inlet management device according to the first embodiment is molded onto the shutter device 4.

According to a third embodiment, the flexible duct 3 of an air inlet management device according to the first embodiment is snapped into engagement on the shutter device 4. For example, the flexible duct comprises a circumferential groove situated in a plane perpendicular to a longitudinal axis of the flexible duct. This groove is situated on the internal surface of the flexible duct. It is configured to cooperate with a corresponding flexible strip arranged along a periphery of the shutter device. According to one variant, the duct comprises a plurality of grooves of the aforementioned type, spaced in relation to each other, and configured to cooperate with a plurality of corresponding parallel flexible strips situated on a periphery of the shutter device. Other forms of grooves and flexible strips are possible. Conversely, it is possible to provide one groove (or a plurality of grooves) in the shutter device and one or more corresponding flexible strips on the internal surface of the flexible duct. These flexible strips may be constituted by protrusions formed in said flexible duct.

According to a fourth embodiment, the flexible duct 3 of an air inlet management device according to one of the previous embodiments is made of thermoplastic polymer. It may, in theory, be made of natural or artificial rubber, even though this is often quite expensive.

According to a fifth embodiment, the thermoplastic polymer of an air inlet management device according to the fourth embodiment is a polypropylene, which in particular exhibits the advantage of being inexpensive, resistant to fatigue and flexing, very light and recyclable.

According to a sixth embodiment, the thermoplastic polymer of an air inlet management device according to the fourth embodiment is an ethylene propylene diene monomer (often designated by its acronym EPDM), which in particular exhibits the advantage of being resistant to oxidation, to adverse weather, to light, to cold and to acids.

According to a seventh embodiment, the flexible duct 3 of an air inlet management device according to one of the preceding embodiment is configured to be fixed by one extremity to the radiator grille of a motor vehicle. The duct is thus capable of guiding the air from its entry into the vehicle via the radiator grille, which minimizes any air losses.

According to an eighth embodiment, the flexible duct 3 of an air inlet management device according to one of the preceding embodiment is configured to be fixed by one extremity to a support 6 for a radiator 7 (which is often designated by the English expression "bolster"). The flexible duct is thus capable of guiding the air that has entered the vehicle via the radiator grille as far as the radiator, thereby avoiding unnecessary wastage of air. In vehicles equipped with air conditioning, a condenser is usually positioned ahead of the radiator which is intended to cool the engine of the motor vehicle. Like the radiator, the condenser is a heat exchanger, although in this particular case its function is the air conditioning of the passenger compartment and not the cooling of the engine. In practice, by guiding the air as far as the condenser, the flexible duct thus also guides the air as far as the radiator, which is situated immediately behind it. The guided air in effect passes through the condenser, and then immediately afterwards through the radiator.

According to a ninth embodiment, the flexible duct 3 of an air inlet management device according to one of the first to seventh embodiments is configured to be fixed by one extremity to the heat exchanger. The flexible duct 3 may be fixed, for example, to a water collecting chamber, or a cassette, of the heat exchanger. This alternative also permits the use of the duct to guide the air that has entered the vehicle via the radiator grille as far as the heat exchanger, thereby avoiding any unnecessary wastage.

In general terms, the flexible duct may adopt the form of the interior of the front fender and, at the other extremity, may approach as closely as possible to the cooling module.

What is claimed:

1. An air inlet management device for a motor vehicle, comprising:
    a flexible duct for guiding the air entering via a motor vehicle radiator grille; and
    a shutter device fixed in the flexible duct,
    wherein the air inlet management device is fixed in the motor vehicle via the flexible duct, the shutter device then being suspended in the motor vehicle via the flexible duct, and wherein the flexible duct deforms to displace the shutter device from a first position to a second position and back.

2. The air inlet management device as claimed in claim 1, wherein the flexible duct is molded onto the shutter device.

3. The air inlet management device as claimed in claim 1, wherein the flexible duct is snapped into engagement on the shutter device.

4. The air inlet management device as claimed in claim 1, wherein the flexible duct is made of thermoplastic polymer.

5. The air inlet management device as claimed in claim 4, wherein the thermoplastic polymer is a polypropylene.

6. The air inlet management device as claimed in claim 4, wherein the thermoplastic polymer is an ethylene propylene diene monomer.

7. The air inlet management device as claimed in claim 1, wherein the flexible duct is fixed by one extremity to the radiator grille of the motor vehicle.

8. The air inlet management device as claimed in claim 1, wherein the flexible duct is fixed by one extremity to a support for a radiator.

9. The air inlet management device as claimed in claim 1, wherein the flexible duct is fixed by one extremity to a heat exchanger cassette.

* * * * *